United States Patent
Ayroldi

[11] Patent Number: 5,217,611
[45] Date of Patent: Jun. 8, 1993

[54] SYSTEM AND APPARATUS FOR THE MECHANICAL CLEANING OF WATER SURFACES, EVEN IN THE OPEN, FROM FLOATING POLLUTANTS

[76] Inventor: Giuseppe Ayroldi, Via Guido Zanobini, 55, I-00175 Rome, Italy

[21] Appl. No.: 720,487
[22] PCT Filed: Jul. 10, 1990
[86] PCT No.: PCT/IT90/00063
§ 371 Date: Jun. 27, 1991
§ 102(e) Date: Jun. 27, 1991
[87] PCT Pub. No.: WO91/01410
PCT Pub. Date: Feb. 7, 1991

[30] Foreign Application Priority Data
Jul. 11, 1989 [IT] Italy .................. 48174 A/89

[51] Int. Cl.⁵ .................................. E02B 15/04
[52] U.S. Cl. ......................... 210/242.1; 210/242.3; 210/923
[58] Field of Search .......... 210/242.1, 242.3, 242.4, 210/776, 923, 924

[56] References Cited

U.S. PATENT DOCUMENTS

| | | | |
|---|---|---|---|
| 3,348,690 | 10/1967 | Cornelissen | 210/923 |
| 3,684,095 | 8/1972 | Ayers | 210/923 |
| 3,693,805 | 9/1972 | Tillett et al. | 210/923 |
| 3,731,813 | 8/1973 | Tipton | 210/923 |
| 3,785,496 | 1/1974 | Smith, Jr. | 210/242.3 |
| 3,983,034 | 9/1976 | Wilson | 210/923 |
| 4,039,454 | 8/1977 | Miller et al. | 210/923 |
| 4,209,400 | 6/1980 | Mayes | 210/776 |
| 4,426,288 | 1/1984 | Münto | 210/242.3 |
| 4,673,497 | 6/1987 | Lundin | 210/242.3 |
| 5,094,744 | 3/1992 | Scovell | 210/242.3 |

FOREIGN PATENT DOCUMENTS

| | | |
|---|---|---|
| 117854 | 9/1984 | European Pat. Off. |
| 206915 | 12/1986 | European Pat. Off. |
| 2056299 | 3/1981 | United Kingdom |
| 2065489 | 7/1981 | United Kingdom |

Primary Examiner—Stanley S. Silverman
Assistant Examiner—Christopher Upton
Attorney, Agent, or Firm—Rothwell, Figg, Ernst & Kurz

[57] ABSTRACT

The apparatus has two portions wherein the first conveying portion functions to deflect and concentrate a large strip of the surface floating pollutant to be recovered, towards a narrower throat or exit section, and the second recovery portion effects the mechanical recovery of the pollutant thickened layer flowing through the throat of the first portion. The conveying portion includes a vessel itself with two floating arms symmetrically set in a "V" shape aft the vessel on its two sides, with their entrance section positioned just back the midship section of the vessel, while the throat or exit section is placed aft the vessel.

The recovery portion of this equipment is a self-floating apparatus positioned immediately on the back of the throat of the conveying portion, and is towed by the vessel by means of a swinging fork. The recovery portion has a floating body which surrounds and delimits laterally, along three perpendicular sides, an inner chamber which has its bottom closed by a bottom wall and its front side defined by a cylindrical, horizontal drum rotated by an engine.

9 Claims, 5 Drawing Sheets

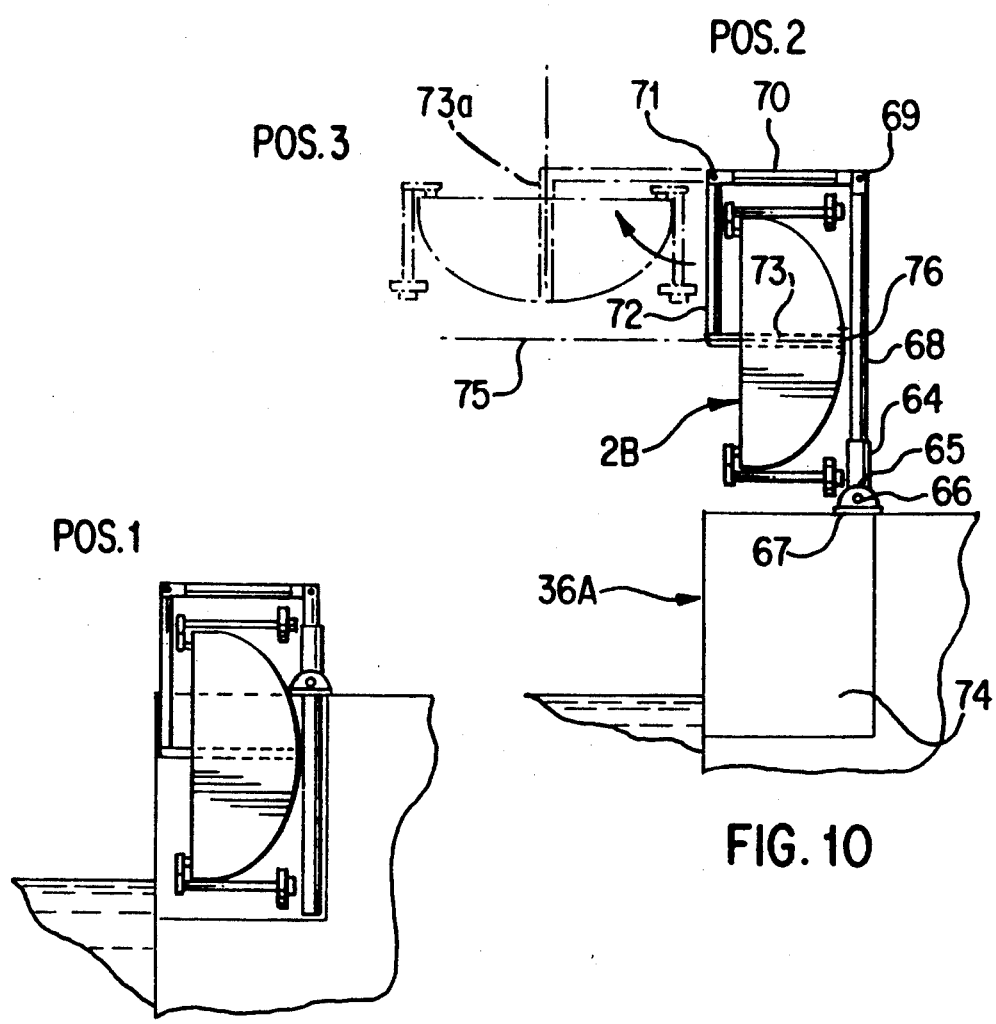
FIG. 9
FIG. 10
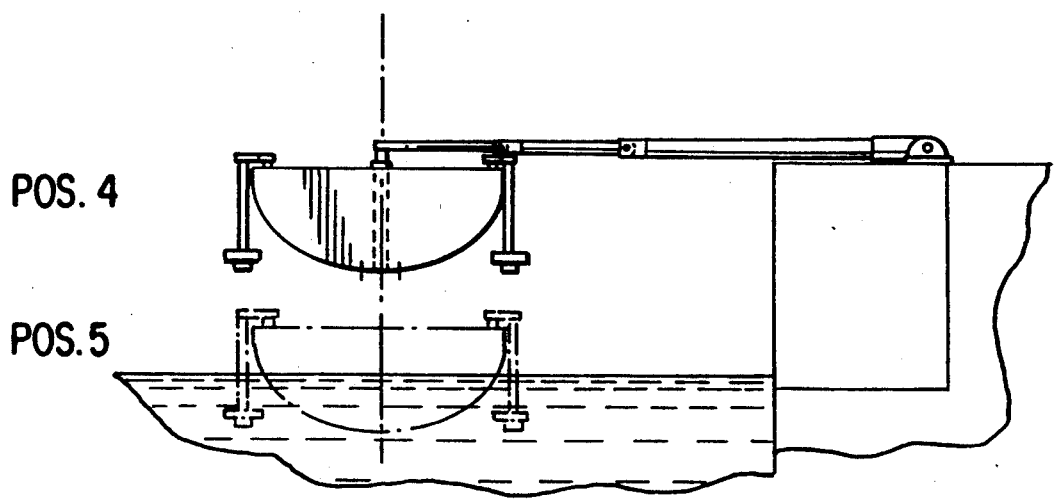
FIG. 11

SYSTEM AND APPARATUS FOR THE MECHANICAL CLEANING OF WATER SURFACES, EVEN IN THE OPEN, FROM FLOATING POLLUTANTS

BACKGROUND

1. Field of the Invention

The present invention relates to a system and apparatus able to mechanically convey and recover fluid substances and/or solid debris floating on an uneven water surface.

2. Prior Art Background

The damage caused to the marine environment by the very huge quantities of oil which is spilled every year at sea owing to accidents of various nature to oil carriers, to production plants, to oil loading and unloading facilities, to refineries, to underwater pipelines, and so on, is well known.

The serious pollution problems represented by the massive and recurrent presence, especially inside the harbours, of enormous quantities of plastic wastes and other solid or semisolid debris are also well known.

Various types of devices are already known to try to mechanically recover these pollutants, but even though some machines are able to mechanically recover solid debris (such as with grids or the mechanical baskets) which can be considered effective, to date there does not exist any equipment really able to effectively recover fluid or semifluid pollutants floating on open waters, which are subjected to a wave-motion, such as in harbours and on the open sea.

All the conveying apparatus presently known are represented by the so-called "floating barriers" (or "booms") and by the so-called "V-shaped conveying apparatuses." Both of these conveying systems have by now widely proven to be substantially unable to produce, especially in the open sea, a conveying effect towards their center or towards one of their own extremities (in the case of the booms) or towards their own exit throat (in the case of the "V-shaped" apparatuses) of the fluid pollutant layer encountered by their entrance section.

Long experience, supported by evidence beyond doubt and evident physical considerations have demonstrated that:

a) The floating booms can be considered of some usefulness only when employed to delineate, while standstill and in calm waters, a polluted area of water, and to deflect, if correctly positioned, an oily layer floating on streaming waters with no waves (such as rivers or canals), while they cannot successfully operate when towed, e.g., by two vessels in the open sea;

b) The so-called "V-shaped" conveyors, as shown by theoretical studies as well as practical tests carried out by various authors (e.g., Cross and Hoult or J. C. Wambold and Curtiss Reed of Pennsylvania State University), are not absolutely able to do the job they ought to, since, in order to deflect and convey towards a narrower exit throat all the water which ought to enter the entrance section of such a conveying system, it would be necessary to impress to all the body of water which enters the entrance section of such a conveyor, accelerations which the "V-shaped" conveyor definitely cannot give. On the contrary, and just because of the inability of this type of conveying system to deflect and enable a flow through its throat or exit section of all the great body of water which presents itself in front of the entrance section, a strong turbulence and high pressure form in the water comprehended between the two arms, which actually pushes and deflects to the outside the greatest part of the said body of water, while the very small amount of water which some way succeeds in entering said entrance section, for the greater part will not even reach the exit section, but will escape laterally to the outside, overflowing the conveyor arms or escaping from underneath them.

Turning now to the oil mechanical recovery problem, all the oil recovery machines presently known can be basically grouped into three fundamental types, namely: the "dipping" type, the "weir" type and the "aspiration" type, all of which present specific and fundamental disadvantages, which are, respectively: a) a small oil recovery capacity; b) the impossibility of correctly positioning a weir type device in the presence of waves; and, c) the enormous amount of water which is recovered together with the oils.

SUMMARY OF THE INVENTION

The noted deficiencies in this state of the art are remedied by the present invention, which concerns an apparatus for the mechanical conveyance and recovery of the oils and/or noxious substances (hereinafter generically called "oil") and/or solid or semisolid floating debris, capable of effectively operating even in the open sea with very high levels of efficiency and with an extreme simplicity of action. Basically this equipment consists of two main portions, of which the first has the function of conveying towards a narrower throat or exit section a larger strip of the polluted surface to be removed, while the second has the function of effecting the mechanical recovery of the liquid and/or solid floating pollutants. These two portions, with their complementary and integrated operation, form a unitary and intrinsically complete system for the removal and recovery of oily and/or solid debris floating layers, which is the subject of the present invention such as it will be hereinafter described and claimed.

BRIEF DESCRIPTION OF THE DRAWINGS

Preferred embodiments of the invention will be now described and illustrated with reference to the accompanying drawings, in which:

FIG. 9 is a front view of a variant of launching/positioning and lifting apparatus, in the transportation position;

FIG. 10 is a front view of the same variant as FIG. 9, which shows two positions reached by the apparatus when launching the conveying/skimming apparatus;

FIG. 11 is a front view of the same variant as FIGS. 9 and 10, which shows the third and the final positions reached by the apparatus, when launching the conveying/skimming apparatus.

DETAILED DESCRIPTION OF THE PREFERRED EMBODIMENTS

Figure 1:
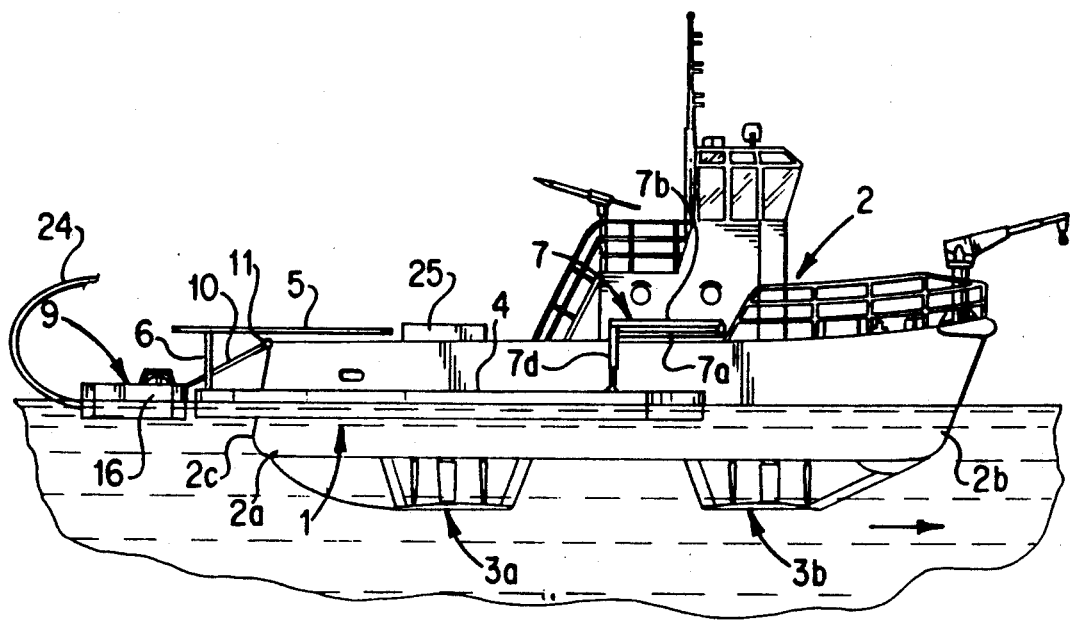
FIG. 1 shows a schematic longitudinal view of the equipment of this invention, in a self-propelled version of the invention, according to a preferred embodiment.

With reference to FIGS. 1 to 4, a preferred embodiment of an apparatus for the mechanical recovery of oils, of the self-propelled type, according to the present invention will now be described.

The first portion (conveying portion) of the equipment, generically referred to with the numeral 1, and which forms the first innovative functional part of the equipment, consists of:

a) a vessel, generically indicated by 2, provided with two Voith Schneider propellers 3a and 3b, positioned between the bow 2b and the stern 2a of the vessel 2 and respectively driven by two engines, the vessel's hull having, approximately, a round bilge displacement form with the midships section very wide in respect to the total length of the vessel, the stern of the hull also having a reverse bend of side plates which form an elongation of the stern frame making a vertical fin 2c extending from the central hull line; and b) two conveying floating arms, generally indicated by the numerals 4,4, symmetrically placed in a "V" shape on both sides of the vessel 2, with their entrance section just behind the vessel's midships section, and with their throat aft the vessel and hence in its wake. These arms are connected to the vessel 2 by means of a rigid structure 5,5, which extends from the stern of the vessel 2 and supports two vertical fulcrum pins 6,6, which are inserted into appropriate seats provided in the back sides of the arms 4,4, and by means of a pair of adjustable arms formed by two articulated shafts 7a,7b hinged together. In turn, the free extremities of the shafts 7a are articulated on the deck of the vessel 2 by means of two vertical hinges 7c, while the free extremities of the shafts 7b support fulcrum vertical pins 7d,7d, which are inserted into appropriate seats provided in the top sides 4b of the arms 4,4. A cylinder 8, preferably of the hydraulic type, mounted between each pair of shafts 7a,7b, will actuate the opening and closing of the said articulated shafts and consequently regulates the opening of the conveyor arms 4,4, as shown in dashed lines in FIG. 2.

Figure 3:
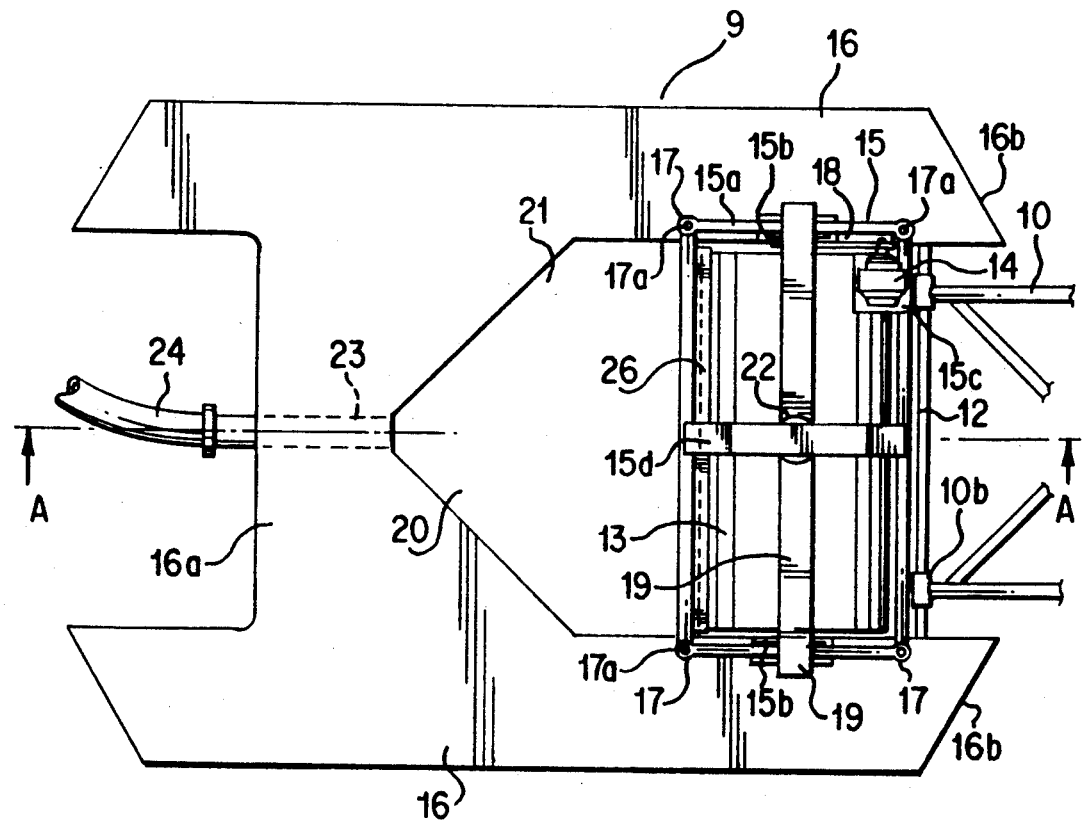
FIG. 3 is a schematic top view of a second portion (skimming unit) of the equipment having a swinging fork connecting the skimming unit to the central stern of the vessel, according to a first embodiment.
Figure 4:
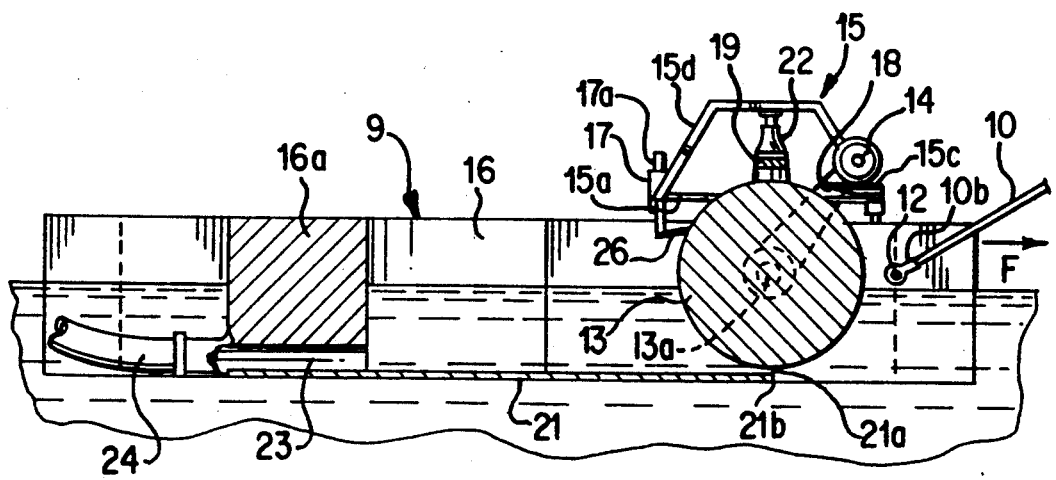
FIG. 4 is a cross section taken along line A—A of FIG. 3.
Figure 7:
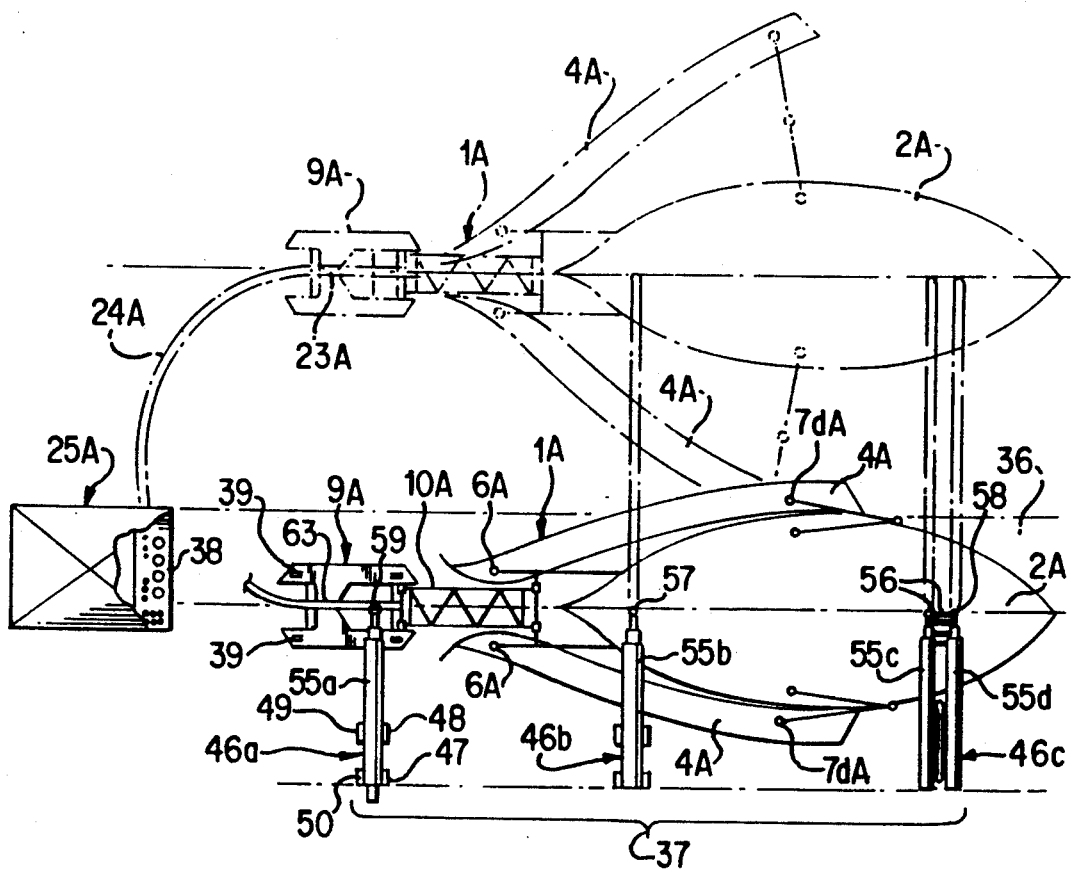
FIG. 7 is a top view of another embodiment showing the equipment of the invention, modified in order to be carried, launched, positioned and operated from a tender ship.

The apparatus (skimmer) whose function is to recover the floating oils which flow through the throat of the conveying sector (i.e., the second portion of the machine), generally referred to with 9 in FIGS. 1 and 7, and represented in detail and in a larger scale in FIGS. 3 and 4, is placed immediately after the throat of the conveying portion 1.

This recovery apparatus 9 is towed by the vessel 2 by means of the swinging fork 10, whose fore extremity 10a is mounted by means of a horizontal hinge around a transverse axle 11 fixed to the vessel 2, and whose rear extremity 10b is mounted by means of hinges with horizontal axle 12 fixed to the apparatus 9.

The recovery apparatus 9 is basically comprised, in a preferred embodiment, of a lateral float 16 having a plan shape generically similar to the letter "H", which delineates on three sides an inner chamber 20 which is closed on the fore side by means of a horizontal drum 13, and has a bottom closed by a bottom wall 21 whose front rim 21b is in the vertical plane passing through the axis of the drum 13, and hence just below its lowest generatrix.

A gap, or horizontal adjustable slit 21a, which is the intake port of the skimming apparatus 9, is formed between the lowest generatrix of the drum 13 and the front rim 21b of the bottom wall 21. Through the intake 21a the oil (thanks to the physical phenomena hereinafter described) enters the chamber 20, from where it is continuously and immediately sucked and conveyed towards the treatment or holding tanks through the pumping unit 25, connected by means of a flexible hose 24 to an outlet port positioned at the center and on the bottom of the transverse section 16a of the float 16.

In order to adjust the gap 21a (i.e., the distance between the drum 13 and the front rim 21b of the bottom wall 21) to adapt this skimming unit as well as possible to different quantities and thicknesses of the oily layers to be recovered, the drum 13, and engine 14, which rotates the drum and a scraping blade 26 mounted adjacent the drum are mounted (in a preferred embodiment) on an adjustable structure 15. This structure 15 consists of a frame 15a, on which the following parts are mounted: driving sleeves 17 which house vertical pivots 17a positioned on the upper part of the float 16, plates or vertical wing slabs 15b provided with journal boxes for the axle 13a of the drum 13, the support plate 15c of the engine 14 which rotates the drum 13 preferably by means of a transmission belt 18, the supports of the scraping blades 26 and a saddle-shaped member 15d.

A second saddle-shaped cross bar 19, orthogonal to the first saddle-shaped member 15d, is rigidly mounted on the float 16 of the recovery equipment, and a jack (preferably of the hydraulic type) 22 is mounted at the intersection of these two crossbars in the space existing between them. In this way it is possible to modify, acting even at a distance from the jack 22, the position (height) of the drum 13 in respect to the rest of the skimmer and hence also in respect of the front rim 21b of the bottom wall 21, varying at will the height of the intake gap 21a.

Of course, other devices can be used to regulate the height of the structure 15 and, hence, the gap of the intake 21a, such as using a threaded shaft with screw-nuts driven by stepper motors mounted in place of the sleeves 17a, the slide guide pivots 17 and the jack 22, or by a plurality of independent hydraulic jacks actuated by sophisticated flow distribution devices through a computerized system for the control of the homogeneity and degree of the elevation, or by means of other mechanisms.

The operation of this equipment, with reference to FIGS. 1 to 4 will now be described.

Figure 2:
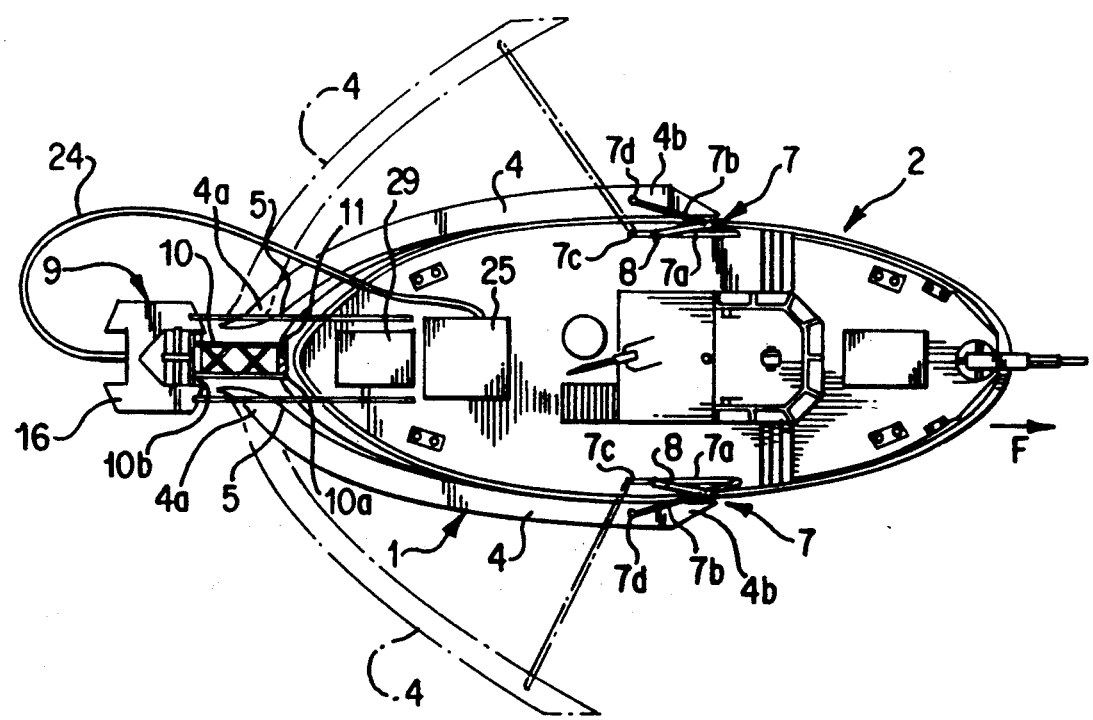
FIG. 2 is a top view of the same equipment.

Once the polluted liquid surface is reached, an operator on board the vessel will put, without interrupting the sailing, the conveying arms and the oil recovery unit in operative trim, by effecting the following procedure:

a) he will have the conveying arms 4 opened until their maximum opening is reached (or the most appropriate angle according to the specific needs and/or operating conditions), shown with a dashed line in FIG. 2, acting on the cylinders or jacks 8, which will hence bring the pair of shafts 7a,7b into a substantial lined position (or in some intermediate position if the specific working conditions require so);

b) he will rotate, by starting the engine 14, the drum 13 in the direction indicated by the arrow F1 in FIG. 4;

c) he will start the pumping unit 25;

d) he will adjust, by means of the jack 22, the amount of the intake gap 21a of skimming unit 9.

After reaching the correct operating trim, the equipment according to the described preferred embodiment of the invention, will perform the conveyance and the recovery of the floating oil, since it will produce within the body of water it crosses the physical phenomena, which will be hereinafter described and illustrated. These physical phenomena are utilized and exploited by the apparatus of the present invention in order to convey and hence mechanically recover a large strip of oil and/or of other floating pollutant.

It is a commonly known fact and amply described in naval architectural texts, that a round bilge displacement hull "lifts" the most superficial layer of the water which it crosses, producing the well-known wave formation (Kelvin's wave) which tends to flow, lapping them, along the broadsides of the vessel.

Theoretical studies and practical tests have demonstrated that, during the phase of "penetration" of the vessel into a body of water, the polluted floating layer lying on the areas directly crossed by the vessel (and hence laterally pushed by its passing), tend to remain within the limits of the aforementioned wave formation, even thickening itself during the crossing of the forward section of the vessel. The body of water not directly affected by this wave formation, i.e., outside its reach, is in no way influenced by the cruising of the vessel, and remains, undisturbed, in its initial position.

Consequently, and owing also to the particular geometric shape of the vessel 2, all the polluted floating layer within the entrance section of the conveying arms 4,4 will always remain included within the limits of their entrance section even after the passage of the forward section of the vessel, since the front part of the conveying arms 4,4 always remains outside the area encompassed by the just discussed wave formation. The oily layer which reaches the midship section of the vessel 2, and hence also the entrance section of the conveying arms 4,4, will effectively be deflected and orderly conveyed towards the center of the conveying section 1 (and, hence, towards its exit throat), thanks to the innovative positioning of the conveying arms 4,4, which have their entrance section positioned approximately at the midships section, and their throat in the vessel's wake. In fact, the equipment of the invention precisely exploits the vacuum created aft a vessel with a round bilge displacement hull (i.e., the vacuum which forms the wake), to effectively permit the conveying arms 4,4 to deflect towards the center of this apparatus, and hence towards its throat, all the surface layer of (polluted) water encountered by their entrance section.

The conveying arms 4,4 assume therefore, basically, the task of cooperating with the wake's vacuum, thus causing the polluted surface layer being conveyed towards this authentic pole of attraction, in preference to the remaining parts of the whole mass of water which surrounds this pole of attraction.

In order, then, to prevent any possible interference between the two currents of water coming from the two sides of the vessel 2, with consequent, possible, formation of turbulence in the area of their confluence, the vessel has a reverse curving of side platings which forms an elongation of the stern frame similar to a vertical fin extending from the central hull line, with the function of deflecting and rendering the two currents parallel to each other. In the same way, two additional vertical fins 4a are mounted in proximity of the rear end of the two conveying arms 4,4, in order to stabilize and render parallel the rather consistent flows which form and tend to follow the rear side (somewhat like a wake) of the two conveying arms 4,4.

Now the operation of the apparatus (skimmer) designed for the recovery of fluid and semifluid polluting substances will be described.

Positioned immediately on the rear of the throat of the conveying equipment 1, the apparatus 9 is towed as described above, by the vessel 2 in the direction of F, with an absolute speed equal to that of the vessel, but at a relative speed with respect to the surrounding water very much smaller than the said absolute speed, since the body of water which forms, immediately aft the vessel 2, the vessel's wake, within which the skimmer 9 works, tends to follow, attracted by the depression area which forms astern a round bilge hull, the motion of the vessel 2.

The oily layer floating on the current flowing through the throat of the conveyor arms 4, will, hence, contact with the same speed of the water forming the wake the submerged portion of the cylindrical surface of the drum 13 of the apparatus 9, of which the oily layer will follow the rotating movement by the effect of:

a) the attraction forces which exist between the oily layer surface and the oleophilic material (preferably stainless steel or a synthetic resin) with which the cylinder drum 13 is built;

b) the forces of cohesion (internal friction) which tend to maintain united (i.e. not fractioned or dispersed) the oil which constitutes the said oily layer, opposing its dispersion or breaking up; and c) the centripetal forces which are established (Bernouilli's law, Taylor's vortex, the theory of the connected vortexes) in the fluid bodies surrounding a rotating drum.

Having this way come into contact with the rotating drum surface, the oily layer is dragged by the drum underneath the water and, hence, towards the horizontal, adjustable gap between the rotating drum 13 and the front rim 21b of the bottom wall 21, which constitutes the intake 21a of the skimmer 9.

Studies carried out on models in various tank tests have widely shown how, in order to attain a laminar deflection and dragging downwards, it is necessary that the drum 13 have an angular speed capable of producing peripheral speed equal (approx.) to, at least, 1.5 the speed of the skimmer 9 in respect to the water which surrounds it. In these conditions it is assumed to be possible to even observe the formation of Taylor vortexes around the submerged portion of the drum, a vortex which would demonstrate the forming and the establishing of a centripetal force which would tend to maintain the deflected oily layer always adhering to the cylindrical surface of the drum, following its movement.

Reaching in this way, the proximity of the intake 21a, the oily layer will enter the inner chamber 20 of the skimmer 9, passing through the intake gap 21a thanks to the combined action exerted on this oily layer by the rotation of the drum 13 and the pole of depression which the pumping unit 25, aspirating and taking away continuously the fluid entering the chamber 20, creates on the intake 21a.

The scraping blade 26 causes the scraped-off oil which remains stuck to the surface of the drum 13 to fall down into the chamber 20. This allows the cylindrical surface of the drum 13 to present itself again perfectly dry to the oil flow which the conveying apparatus continuously conveys towards the drum 13 and the skimming unit 9.

Finally, in order to improve the yield of the skimmer 9, and its capability of adapting itself with the maximum facility and spontaneousness to the various operating conditions, a few features have been introduced into its shape and configuration, in order to improve its capability to better ride the waves.

To this purpose, the front parts 16b of the "H"-shaped side floats 16 have been lengthened forwards so to let them extend in front of the drum 13, in order to let the impact of the coming waves to be mainly absorbed by those front extensions 16b of the floats 16 rather than by the drum 13 itself.

It is, therefore, actually possible to employ this skimmer also in the open sea, because it is really easy to adapt it to every possible operating condition. It is possible, in fact, to adjust the gap of the intake 21a, the rotation speed of the drum 13, the delivery capacity of the pumping unit 25, as well as (by adjusting the speed of the self-propelled vessel 2) the working speed of the apparatus 1-9 through the polluted area.

Figure 5:
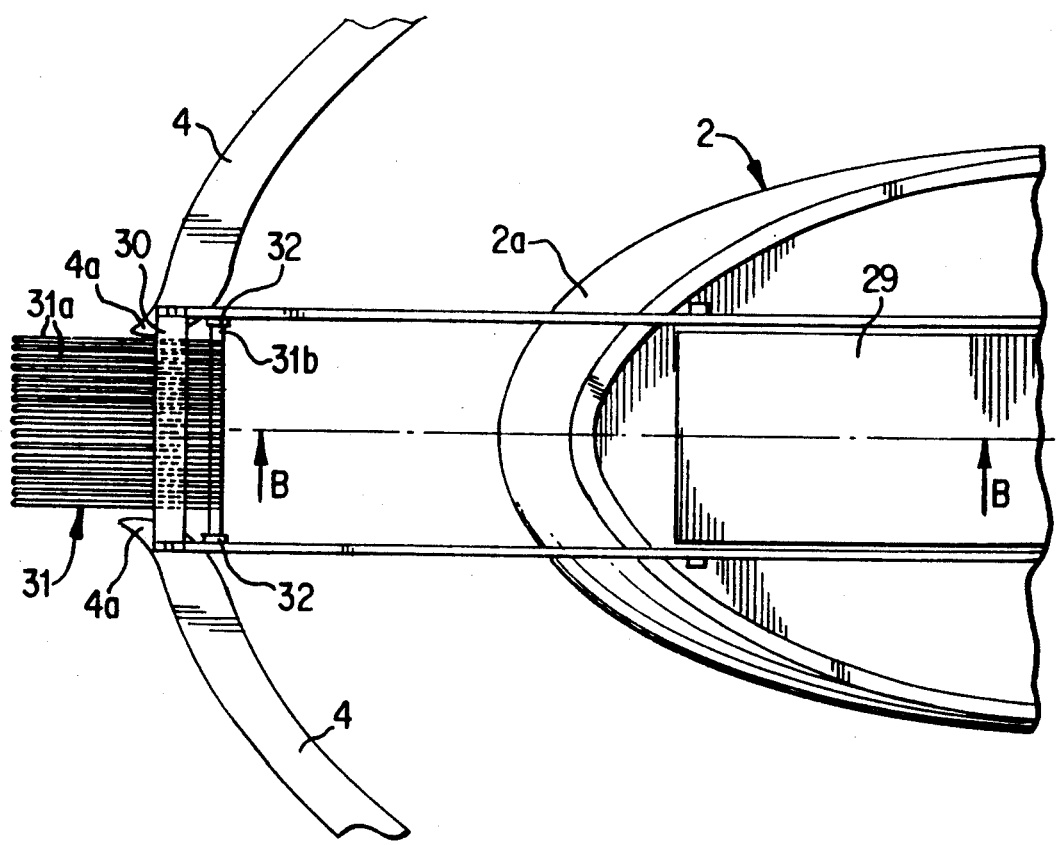
FIG. 5 is a top view, partial and in a larger scale, of the equipment for the mechanical recovery of solid or semisolid debris.
Figure 6:
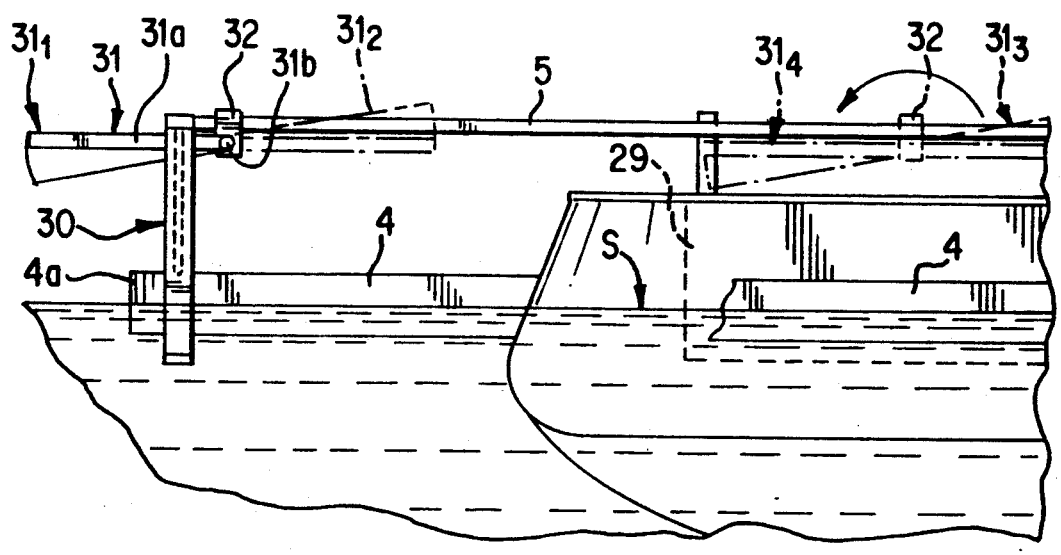
FIG. 6 is a cross section taken along line B—B of FIG. 5.

In the case where solid or semi-solid debris is to be recovered, a mechanical grid or a basket of an appropriate type can be fitted at the exit throat of the conveying section vessel 2. A mechanical grid of a preferred type, as is generally illustrated in FIGS. 5 and 6, is provided with a fixed comb 30 and a stripping comb 31. The fixed comb 30 is mounted on the rigid structure 5,5, in correspondence (approx.) of the hinges 6,6 and hence of the throat of the conveyor arms 4, in such a manner that its teeth 30a are vertically turned downwards and protrude underneath the water level in order to stop and to contain all the solid debris there conveyed by the conveying system. The teeth of the stripping comb 31 are mounted on a transverse shaft 31b hinged, on both extremities, to the slide-shoes 32,32 which can slide on the same rigid structure 5,5 which also supports, rigidly, the fixed comb 30.

The "L"-shaped teeth of the stripping comb 31 are positioned in such a way to permit their "penetration" into the interspaces left between the teeth of the fixed comb 30.

The first and the last teeth of the stripping comb have a triangular-like shape, in order to render, together with the internal "L"-shaped teeth, the stripping comb similar to a basket, for a better containment of the recovered solid debris during transportation.

As already stated, the stripping comb 31 may run in both directions along the rigid structure 5,5, which hence also acts as a running guide, and can also rotate, counterclockwise, around the hinges set on the sliding shoes 32,32 in which the two extremities of the transverse shaft 31b are housed.

Such movements are allowed by suitable motive means such as hydraulic engines and cylinders, racks and the like (not represented in the drawings).

Referring now to FIGS. 5 and 6, the operation of this mechanism will be described. The solid debris retained by the fixed comb 30, is recovered by the stripping comb 31 which, rotating counterclockwise through an angle of 180° from the position $31_1$ (waiting position), passes through the teeth of the fixed comb 30, recovering all the solid debris the fixed comb had stopped, and reaches the position $31_2$ (intake position). From this position the stripping comb, together with the solid debris recovered, is run onto the rigid structure 5,5 until it reaches the position $31_3$ (translated position) which is above the recovered waste container 29. Here the stripping comb is again rotated counterclockwise until it reaches the position $31_4$ (discharge position), thus discharging all the recovered debris into the container 29.

From position $31_4$ the stripping comb returns, by running in the opposite direction on the structure 5,5, to the initial position $31_1$. This cycle can be, automatically or at will, periodically repeated. It is obvious that the equipment just described is intended for the recovery of solid or semi-solid debris only.

It can, however, work together, when necessary, with the skimmer 9, when the operating circumstances so require.

It is also worth noting that, when technical advantages or preferences would require it, the propelling system of the vessel 2 could be of a different type rather than the Voith-Schneider propellers here foreseen.

Figure 8:
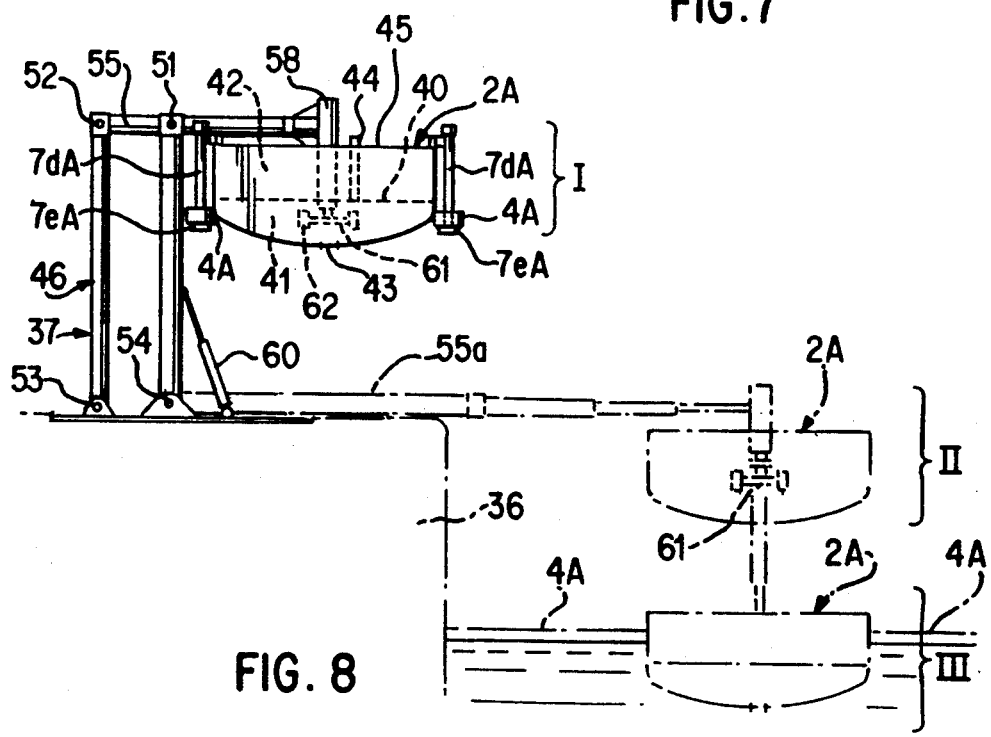
FIG. 8 is a front view of the embodiment shown in FIG. 7.

With reference to FIGS. 7 and 8, an embodiment of the same invention which is not self-propelled, but which must, instead, be operated from a tender ship 36 will now be described.

This embodiment comprises, also, all the mechanical means for assembling the apparatus on board the tender 36, as well as for launching and operating it during cleaning operations.

Technically, this embodiment differs from the one described above not only because in this form the floating body or central vessel 2A of the conveying equipment 1A, positioned between the two conveying arms 4A is not self-propelled, but also because it does not have a wheel house, the tanks for the holding of the recovered oils or the pumping unit, since all of the functions carried out by those means are carried out by equivalent means set on board the tender 36.

The vessel 2A, according to this embodiment of the invention, possesses, instead, a few special inner structures, not provided in the self-propelled vessel, which will be described later.

Basically, the apparatus according to this embodiment, includes:
a) a conveying sector 1A;
b) a recovery sector or skimmer 9A, towed by the central body 2A by means of the swinging fork 10A. This skimmer is functionally identical to the skimmer illustrated and described above;
c) equipment for the launching, lifting and positioning of the whole apparatus at sea, which consists of various devices which will be in the following description;
d) control and actuating means set on board the tender;
e) a hose 24A which connects the outlet port (not numbered in the figure) of the recovery section 9A to the pumping unit and then to the treatment/holding tanks (not represented) set on board the tender 36.

Passing now to the detailed description of this embodiment of the invention, the oil recovery section 9A is substantially identical to the one described above, with the only exception that on the upper part of the floating body 16, four hooks 39 are provided for coupling of this item with the launching/beaching means.

The conveying sector 2A has the identical "functional" structure of the one earlier described, from which it differs not only because of the absence on board the central vessel of all the equipment listed above, but also because in this embodiment the central vessel is internally parted by a horizontal wall 40 into two compartments 41 and 42, of which the first, i.e., the interior compartment 41 (see FIG. 8), is provided with an opening 43 near the center of the hull in proximity of the keel, and a breather conduit 44, which, departing from an opening in the horizontal wall 40, extends upwards until it crosses the upper deck 45 of the vessel—or central body 2A.

The reason this inner chamber vessel 2A has two compartments is because a round bilge displacement hull needs, in order to reach its correct floating trim, to be relatively highly weighted. However, to avoid building a very heavy structure, which would also be very difficult to handle, it is preferable to provide an inner partition of the vessel, by means of which the vessel itself can be built with a very light structure, since its correct weight in operation trim is reached owing to the water which enters the lower compartment 41 through the opening 43, while the air herein contained is easily expelled through the breathing conduit 44.

The correct quantity of water to be kept inside the lower compartment 41 can be easily and precisely determined by correctly positioning the horizontal wall 40 inside the vessel to consequently provide a lower compartment 41 of the appropriate volume.

It should also be noted that the four vertical pivots 6A and 7dA for the adjustment of the opening angle of the conveying arms 4A,4A, are similar and function identically to those already described for the self-propelled vessel, differing from those ones only because of the fact that this constructive solution of the pivots 7dA have an enlargement 7eA of their lower extremities to prevent the two conveying arms 4A,4A from coming off the pivots when the equipment is positioned on board the tender.

It will be now described, with reference to FIGS. 7 and 8, the apparatus for the transportation, launching, positioning at sea and lifting of the equipment 1A,9A. The device consists, basically, of three articulated parallelograms, generally indicated with 46a, 46b and 46c in FIG. 7, each one of them being composed of four rigid poles or trellis work 47, 48, 49 and 50 connected to each other by means of horizontal pivot hinges 51, 52, 53 and 54. The horizontal, lower pole of these articulated parallelograms is solidly joined with a load bearing structure of the deck of the tender 36, while the upper ends of the poles of the two articulated parallelograms 46a and 46b are respectively provided with telescopic arms 55a and 55b, while the upper pole of the third parallelogram 46c is provided with the telescopic arms 55c and 55d tied and connected to each other by means of crossbars 56.

These telescopic arms extend from the articulated parallelograms on which they are fitted, towards the broadside of the tender 36, to a distance equal, approximately, to half of the midships section of the vessel 2A, increased by the width of one of the arms of the lateral conveyor. At the head of the most internal section of the horizontal telescopic arms 55b and 55c, are fitted two vertical telescopic poles 57 and 58, while at the head of the telescopic arm 55a is fitted a winch 59.

On each head of the most internal section of the telescopic arms 57 and 58 are mounted (see FIG. 8) cylindrical horizontal pivots 61 which fit in cylindrical seats 62,62 mounted on the longitudinal section of the vessel's hull, and forming together with them a hinge connection between the head of the vertical telescopic arms 57 and 58 and the vessel (or central body) 2A of the conveyor system 1A.

Lastly, on the head of the most internal segment of the telescopic arms 55a, fitted on the articulated parallelogram 46a, is instead mounted the winch 59, whose function is to launch and beach (but not to position, this function being carried out by the central hull 2A of the conveyor 1A by means of the swinging fork 10A) by means of a sling 63 on the recovery section 9A. Three cylinders or jacks 60 are hinged on the deck of the tender, and have the extremities of their piston rod hinged on to the vertical poles of the articulated parallelograms 46 to actuate the lifting to the vertical position and the lowering to the horizontal position of the articulated parallelograms.

The launching system of the apparatus 1A,9A actuated by means of the above-described mechanism, works as follows (see FIGS. and 8). The articulated parallelograms 46a, 46b, and 46c which, when the apparatus 1A,9A is positioned on board the tender (transportation position) 36, are in a vertical position (position I in FIG. 8), are rotated by 90° and brought into a horizontal position actuating the cylinders 60 so that their piston rods are in a retracted position. The apparatus 1A,9A is hence brought to the correct distance on the external side of the tender 36 (position II) by stretching the telescopic arms 55a, 55b, 55c and 55d. Once the apparatus 1A,9A has reached position II, it is lowered and launched at sea by a controlled stretching of the vertical telescopic arms 57 and 58 and the uncoiling of the sling coiled on the drum of the winch 59 (position III). The coordination and functioning in a logical sequence of the different mechanisms (preferably of the hydraulic type) forming the launching, positioning and lifting system just described is actuated through already known means.

The vertical telescopic arms 57 and 58 are extended and once the apparatus 1A,9A has reached the floating position at sea (easily detected, in the event that the said telescopic arms are hydraulically actuated, by a pressure switch on the hydraulic circuit) are allowed (by the use of means, also in this case, already known) to freely slide in and out, to allow the apparatus 1A,9A to freely ride the waves.

Lastly, it should be noted that on the front ends of the conveying arms 4A,4A, in order to prevent the escape of oily substances in the inevitable space left between the arms and the side of the vessel, ejectors (not shown) are provided having the role of dropping tensioactive or dispersant substances apt to create, mainly because of the oil, internal friction (cohesion) forces and of the great decreasing of the interfacial (oil/water interface) forces, a contraction of the oily layer to be removed, so forming, in correspondence of the said space, an oil-free area.

With reference to FIGS. 9, 10 and 11, a variant is now described of the launching, positioning at sea and lifting apparatus, which could be of interest mainly when, because of any reason, the upper deck of the tender ship ought to be left as clear as possible. Basically, this apparatus consists of a sliding/guiding encasement 64, provided with internal antifriction rings, which can rotate around a cylindrical, horizontal hinge 65 assembled between two vertical plates 66 supported on a base plate 67, by a loading structure on the deck of the tender 36A.

A pole 68 is slidably mounted within the encasement 64. On the top of the pole 68 is hinged, through a cylindrical horizontal hinge 69, one extremity of a pole 70, which forms an angle of 90° with the pole 68, and is connected at its other extremity, through a second horizontal hinge 71, to an extremity of a third pole 72, which also forms an angle of 90° with the pole 70, and which bears, rigidly connected to its other extremity, a sleeve 73a, provided with internal antifriction rings, which also forms an angle of 90° with the pole 72.

A guiding encasement 73, having (when the apparatus is in transportation position) one extremity in alignment with the sleeve 73a and the second one with the hole 76 provided on the bottom of the hull of the vessel 2B, is rigidly connected, through mechanical means (not represented in the figure), to a loading structure of the central vessel or floating body 2B.

The vessel or floating body 2B has the same inner structure already described and illustrated in FIG. 8.

FIG. 9 shows the apparatus in the "transportation" position, i.e., set in its lodgment in the tender. Position 2 (FIG. 10) shows the first position reached (the described movements are obtained by means of already very well-known devices, preferably hydraulic cylinders, and are therefore not represented in the figures) by the launching, positioning and lifting apparatus, when launching at sea the oil conveying/recovery apparatus.

When the apparatus reaches this position, a rigid pole—or shaft—75, is manually inserted, within the sliding/guiding encasement 73,73a. Pole 75 is hinged (the cylindrical hinge being not represented in the figures) to the plate 76, which is mechanically anchored to the bottom of the hull of the vessel 2B, around the hole 76.

From position 2 the launching system reaches, through successive movements, the positions 3 and 4 (FIGS. 10 and 11), from the latter one the oil conveying/skimming apparatus is lowered, by means of a winch and a sling (not represented in the figure) on to the sea surface (position 5 or final position).

As in the case of the launching with the articulated parallelograms systems already described, the central body 2B of the conveyor system is launched by means of two of the launching members just described, the first of which (i.e., the launching member connected close to the bow of the central body) is rigidly connected to the launching structure system (i.e., the shaft 75 can slide within the sleeve 73a connected to the pole 72, but the sleeve 73a cannot rotate around the axis of the said pole).

The sleeve assembled on the pole 72 of the second launching member of the launching system (i.e., the one connected astern the vessel 2B) can instead rotate around the axis of the pole 72, in order to allow the system to freely ride the waves.

The skimming portion, launched by the third launching member, is not provided with any sliding bar, sliding/guiding sleeve and guiding encasement, but it is simply lowered at sea by means of a winch and a sling.

It can be seen that the invention provides a highly efficient conveying and recovery system.

The equipment which is the subject of the present invention is particularly suited to operate even in the presence of waves and also in areas distant from the coast because of the effective functioning of this conveyor, which is really capable of effectively deflecting and conveying towards its exit section a very wide strip of the polluted surface to be cleaned, mainly because it is "attracted" by the vacuum which forms in the wake behind the vessel, rather than "pushed" by the two conveying arms; the flexibility and working capacity of the recovery apparatus (skimmer), which is really capable of easily adapting itself to different operating conditions; the characteristic simplicity and functioning with which the different mechanical parts composing the unit are connected to each other; and the simplicity and functionality of the launching, positioning and lifting system in the embodiment of the invention in which the equipment is supported and operated by a tender ship.

I claim :

1. A system for the mechanical cleaning of water surfaces polluted by floating oil pollutants and/or solid or semisolid debris, comprising:

a) a first conveying section, including a central vessel with a round bilge displacement hull, two symmetrical floating arms connected to the central vessel by means of vertical pivots supported by a rigid structure and articulated arms, to thereby permit each of the arms and the central vessel to float independently from each other, the two arms positioned adjacent the vessel to form a horizontal, bi-dimensional funnel arrangement, having an entrance approximately at midships section of the vessel, and an exit astern the vessel, to utilize the vacuum created astern the round bilge displacement hull of the central vessel when it is moving in water in order to effectively permit the two side conveying arms to convey towards the exit all the polluted layer encountered at the entrance;

b) a recovery section, having a floating body, an inner chamber surrounded on three sides by the floating body, an outlet means in the chamber in fluid communication with an external pumping unit and tank means, a horizontal cylindrical drum, the chamber being substantially closed at its front, by the horizontal cylindrical drum, an engine connected to drive the drum, a bottom wall of the chamber on the floating body, the bottom wall having a front rim near the vertical plane passing through the axis of the cylindrical drum and near the lowest generatrix of the drum, to form an adjustable intake gap through which the floating polluted layer may be conveyed in an orderly and laminar way by the rotating drum and into the chamber from which it may be successively sucked and conveyed towards the tank means through the pumping unit; and c) a swinging fork connected between the recovery section and the central vessel to allow the vessel to tow the recovery section, the swinging fork being hinged on a horizontal axis fixed to the central vessel and on a second horizontal axle fixed to the front part of the recovery section.

2. Apparatus for the conveyance and recovery of fluid oil substances in a floating layer and solid or semisolid debris comprising:

a) a vessel having a substantially round ship displacement hull with a reverse curving astern of the side platings, which form an elongation of the stern frame and provide a vertical fin extending along a longitudinal center of the hull;

b) two floating arms which are submerged to the deepness of interest for the recovery of the fluid substances and/or the solid debris, each arm having, in plan, an outline with a curvature progressively growing from the entrance section in order to assist in concentration of the floating layer, fins on the rear end of the arms in order to assist in providing parallel fluid lines of a deflected body of water, the front ends of the arms being shaped to reduce the hydrodynamic resistance and avoid turbulence phenomena, the floating arms being connected to the vessel by means of a pair of fore and rear vertical pivots;

c) a device for the recovery of solid debris supported from and trailing the vessel; and d) a skimmer for the recovery of fluid floating oil positioned astern the vessel and toward by the vessel, the skimmer comprising a floating body basically shaped like the letter "H", a drum supported between longitudinal walls of the H-shaped floating body and in its forward side, an engine for rotating the drum, a transverse intake gap between a peripheral surface of the drum and a bottom wall of the floating body inner chamber within the skimmer defined by the drum, the longitudinal walls of said floating body, a transverse wall of said floating body and the bottom wall, means for adjusting the positioning of the drum in order to vary and adjust the opening of the intake gap, and a pumping unit in fluid communication with the chamber so that the fluid floating oil may be pumped out from the chamber to tank means.

3. Apparatus according to claim 2, wherein the central vessel is a self-propelled, self-steerable ship.

4. Apparatus according to claim 2, wherein the vessel has no propulsion means, a tender ship for conveying the vessel, means connecting the vessel to the tender ship comprising, a plurality of articulated parallelograms which can be lifted into a vertical position or lowered in a horizontal position by cylinders (60), means mounting the articulated parallelograms on the tender, a plurality of telescopic arms, some of the trlrscopic arms mounted along the sides of the articulated parallelograms which support the skimmer and the vessel, while the other of the telescopic arms are mounted spaced apart and linked to one of the parallelograms, and additional vertical telescopic arms of the other telescopic arms; (57,58) being assembled at the innermost segment of the telescopic arms a winch mounted on the innermost portions of one of the telescopic arms, the additional telescopic arms being connected to the vessel through cylindrical, horizontal hinges and the winch being connected to the skimmer by means of a sling.

5. Apparatus according to claim 4, in which the vessel has a hull divided by a basically horizontal wall into two compartments, the lower compartment communicating with the outside through an inner hole provided in the hull under the water line and through a breathing conduit which crosses a deck of the vessel, so that, as soon as the apparatus is launched and the hull of the vessel has contacted the sea surface, a water ballast enters the lower compartment to let the hull of the vessel reach its necessary draft.

6. Apparatus according to claim 2, wherein the device for recovery of solid debris comprises a rigid support structure fixed to the rigid structure, vertical teeth on the fixed comb having end portions under the water surface level, and a stripping comb movably mounted on the support structure with teeth movable between the teeth of the fixed comb, means actuating the stripping comb to slide over a horizontal guide structure portion of the support structure, as well as to rotate counterclockwise around hinges, in such a way that the teeth of the stripping comb can across the spaces between the teeth of the fixed comb and collect solid debris and transport it to tanks.

7. Apparatus according to claim 2, further comprising, a tender ship for launching, positioning at sea and lifting the apparatus, three member structures, each including an encasement assembled on a loading structure of the tender ship by means of a horizontal hinge and a support, a first pole sliding into the encasement and having its upper extremity hinged to one of the two extremities of a second pole vertical with respect to the first pole and which can also rotate by 90°, so that these two poles can become aligned on the second extremity of said pole being hinged to one of the two extremities of a third pole, vertical with respect to the second pole, and which also rotates clockwise by 90°, so that the second and third poles can become aligned, a sleeve assembled on the second extremity of said third pole in correspondence with a seat on the central vessel, rigidly connected to a loading structure of the vessel, a guiding and positioning shaft insertable in both the sleeve and the seat, a plate rigidly connected to a bottom of the hull of the vessel whereby the tender ship may carry the conveying apparatus and skimming apparatus, and then to launch, position at sea and lift it, basically by the following steps:

sliding upwards the first pole within the encasement;
inserting the shaft within the seat and the sleeve and fixing the plate to the hull of the vessel in correspondence to the inner hole of the seat;
rotating the third pole;
rotating, accordingly, the second pole and the first pole, together with the encasement enabling all three poles to become aligned and horizontal; and
lowering the apparatus to the sea.

8. Apparatus according to claim 7 wherein
the three mechanical, identical members of the launching structure are mutually connected by connecting means in order to render more rigid the whole structure to better cope with the mechanical stresses which can be produced by the towing of the system at sea.

9. Apparatus for recovery of oil floating on water, the apparatus comprising:

a) a central vessel;
b) floating arms positioned on each side of the central vessel, the floating arms being pivotally supported from the vessel and having an open position with front tips of the arms on either side of the central vessel at approximately midship, the floating arms when extended forming a path for the floating oil from an entrance between the tips of the arms and the vessel to an exit astern the vessel;
c) a towed recovery section positioned behind and towed from the central vessel, the towed recovery section having a floating body with three sides and a bottom;
d) a rotating cylinder at the front of the floating body and positioned above the bottom to form an inlet gap;
e) means for adjustably opening or closing the inlet gap;
f) means defining a chamber formed by the three sides and bottom of the floating body of the recovery section and the rotating cylinder with the adjustable inlet gap leading to the chamber; and
g) means for removing oil recovered from the chamber.

* * * * *

UNITED STATES PATENT AND TRADEMARK OFFICE
CERTIFICATE OF CORRECTION

PATENT NO. : 5,217,611
DATED : June 8, 1993
INVENTOR(S) : Guiseppe Ayroldi

It is certified that error appears in the above-identified patent and that said Letters Patent is hereby corrected as shown below:

Col. 6, line 64, "-the" should be --the--.

Col. 6, line 65, "21athanks" should be --21a thanks--.

Col. 10, line 22, "FIGS. and" should be --FIGS. 7 and--.

Col. 13, line 38, "trlrscopic" should be --telescopic--.

Col. 14, line 1, "across" should be --cross--.

Signed and Sealed this

Nineteenth Day of April, 1994

Attest:

BRUCE LEHMAN

Attesting Officer

Commissioner of Patents and Trademarks